(12) United States Patent
Conner

(10) Patent No.: US 7,046,407 B2
(45) Date of Patent: May 16, 2006

(54) DIFFRACTIVE COLOR FILTER

(75) Inventor: Arlie R. Conner, Portland, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 582 days.

(21) Appl. No.: 09/681,185

(22) Filed: Feb. 14, 2001

(65) Prior Publication Data

US 2002/0003636 A1 Jan. 10, 2002

Related U.S. Application Data

(60) Provisional application No. 60/182,305, filed on Feb. 14, 2000.

(51) Int. Cl.
*G02B 5/32* (2006.01)

(52) U.S. Cl. .............................. 359/15; 349/95; 349/106

(58) Field of Classification Search .................. 359/15, 359/40, 41, 68, 69; 349/95, 106, 5, 112, 159; 353/32, 34
See application file for complete search history.

(56) References Cited

U.S. PATENT DOCUMENTS

| | | | |
|---|---|---|---|
| 4,209,224 A | 6/1980 | Stewart, Jr. | |
| 4,257,053 A | 3/1981 | Gilbreath | |
| 4,695,721 A | 9/1987 | Fulkerson et al. | |
| 4,994,670 A | 2/1991 | Noble et al. | |
| 5,063,450 A | 11/1991 | Pritchard | |
| 5,161,042 A | 11/1992 | Hamada | |
| 5,402,184 A | 3/1995 | O'Grady et al. | |
| 5,428,467 A | 6/1995 | Schmidt | |
| 5,446,378 A | 8/1995 | Reich et al. | |
| 5,467,206 A | 11/1995 | Loiseaux et al. | |
| 5,506,701 A * | 4/1996 | Ichikawa ..................... | 359/15 |
| 5,537,256 A | 7/1996 | Fergason | |
| 5,550,605 A | 8/1996 | Haraguchi et al. | |
| 5,600,486 A | 2/1997 | Gal et al. | |
| 5,602,679 A | 2/1997 | Dolgoff et al. | |
| 5,626,411 A | 5/1997 | Takahashi et al. | |
| 5,633,737 A * | 5/1997 | Tanaka et al. ................ | 349/95 |
| 5,661,603 A | 8/1997 | Hanano et al. | |
| 5,715,029 A | 2/1998 | Fergason | |
| 5,727,860 A | 3/1998 | Broer et al. | |
| 5,748,828 A | 5/1998 | Steiner et al. | |
| 5,760,850 A * | 6/1998 | Nakanishi et al. ............. | 349/5 |
| 5,764,319 A | 6/1998 | Nishihara | |
| 5,872,654 A | 2/1999 | Shirochi | |
| 5,897,191 A | 4/1999 | Clarke | |
| 5,969,832 A | 10/1999 | Nakanishi et al. | |
| 5,984,478 A | 11/1999 | Doany et al. | |
| 6,141,124 A * | 10/2000 | Suzuki et al. ................ | 359/15 |

(Continued)

FOREIGN PATENT DOCUMENTS

| | | |
|---|---|---|
| EP | 0 606 162 | 7/1994 |
| EP | 0 669 757 | 8/1995 |
| EP | 1 111 575 | 6/2001 |
| GB | 2 258 109 | 1/1993 |
| JP | 2032681 | 2/1990 |
| JP | 4319937 | 11/1992 |
| JP | 5183805 | 7/1993 |

*Primary Examiner*—Leonidas Boutsikaris
(74) *Attorney, Agent, or Firm*—George W. Jonas

(57) ABSTRACT

A color display system includes a color light separator that separates incident white illumination light into red, green and blue wavelength bands to be directed to distinct color component sub-pixels (sometimes called dots) that are arranged in a dot-matrix, color triad arrangement (e.g., stripe or delta) to form individual picture elements (pixels) on a pixelated electronic image device (e.g., LCD of DMD). The entire picture is optically shifted from one set of color component sub-pixels to another in a 3-field sequence. As a result, the sets of red, green and blue color component sub-pixels appear to an observer as a single full-color image, thereby providing a dot sequential color display.

21 Claims, 13 Drawing Sheets

U.S. PATENT DOCUMENTS

| | | |
|---|---|---|
| RE37,218 E | 6/2001 | Densmore et al. |
| 6,243,055 B1 | 6/2001 | Fergason |
| 6,280,037 B1 | 8/2001 | Smith |
| 6,320,698 B1 | 11/2001 | Suzuki |
| 6,359,719 B1 * | 3/2002 | Ori .......................... 359/242 |
| 6,374,048 B1 | 4/2002 | Uenaka et al. |
| 6,407,726 B1 | 6/2002 | Endo et al. |
| 6,426,810 B1 * | 7/2002 | Joubert et al. ............... 359/15 |
| 6,464,359 B1 | 10/2002 | Owen et al. |
| 2002/0003636 A1 | 1/2001 | Conner |
| 2002/0008812 A1 | 1/2002 | Conner et al. |
| 2003/0058412 A1 | 3/2003 | Owen et al. |

\* cited by examiner

Fig. 2 - Prior Art
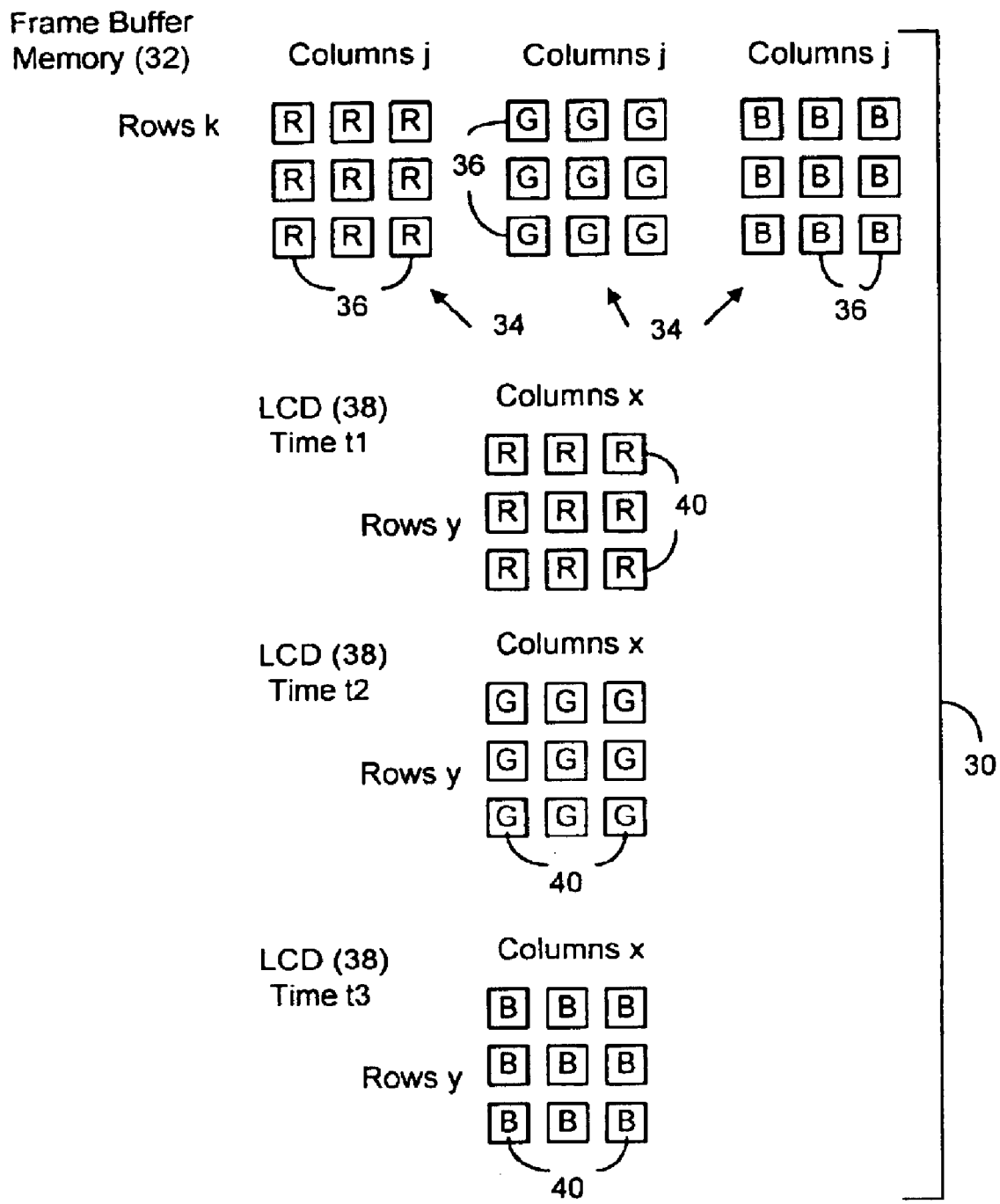

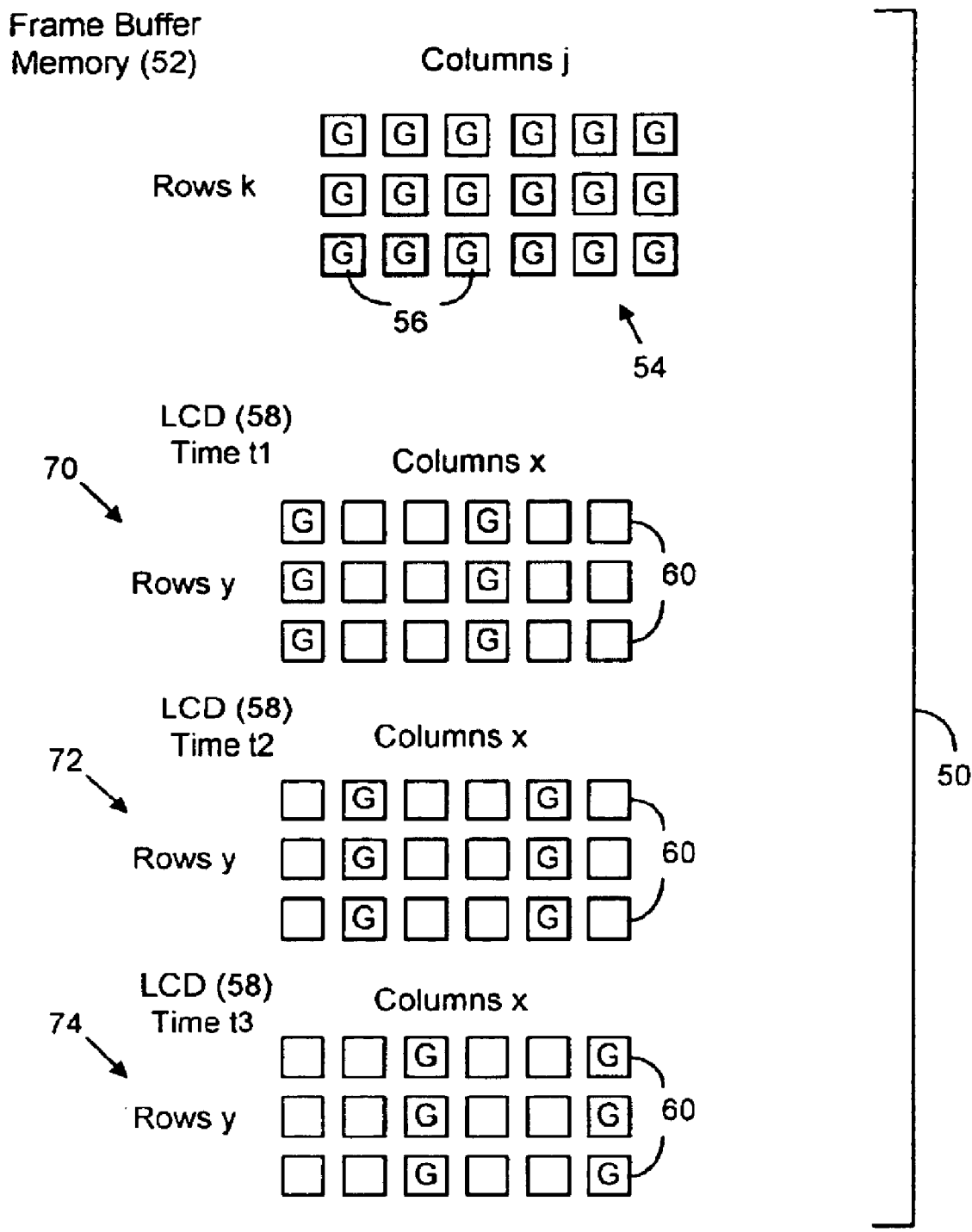

Holographic Grating

Fig. 18
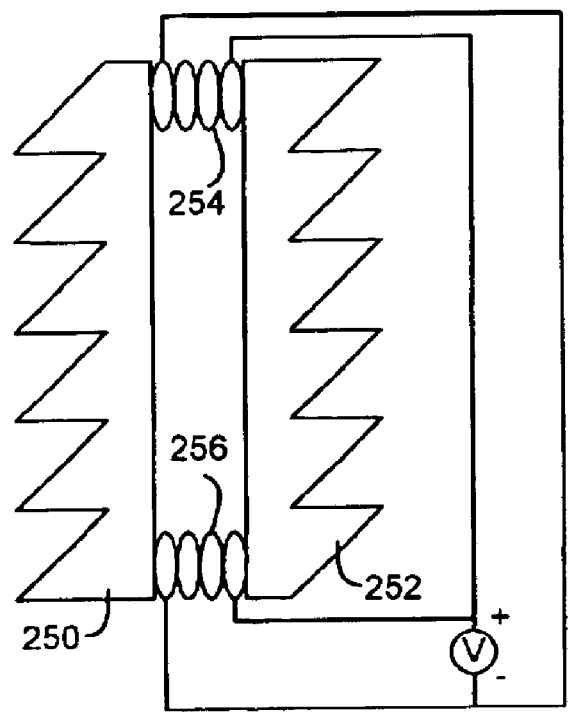
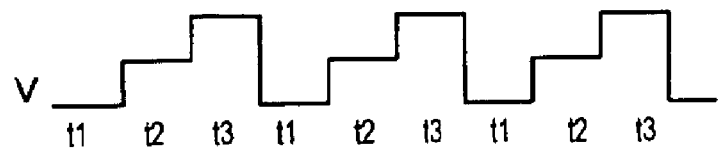
Fig. 19
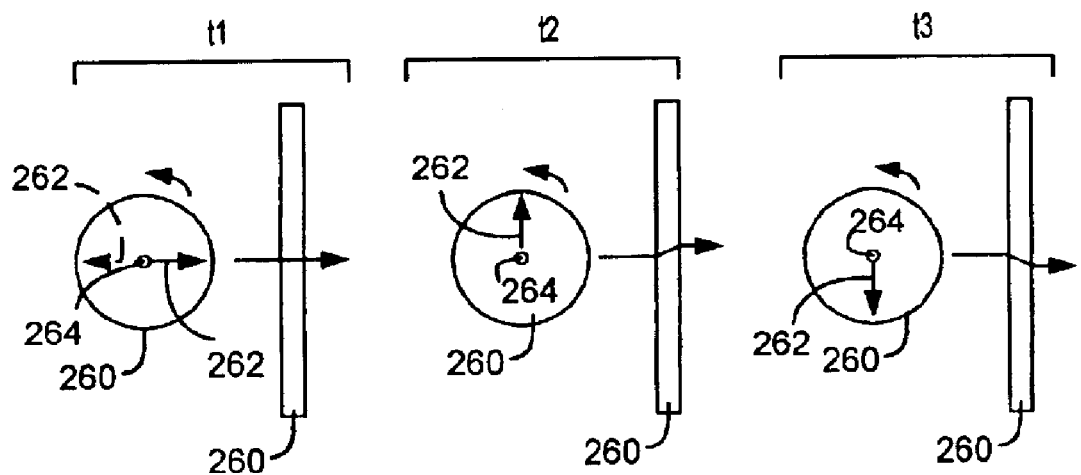

SIDE VIEW

TOP VIEW

DIFFRACTIVE COLOR FILTER

SUMMARY OF INVENTION

There are many ways to produce a full color matrix-addressed display, but almost all methods require 3 independent elements of Red, Green and Blue coloration, so as to be able to mix (in the additive color method) each primary in variable ratios to be able to cover the entire color gamut.

One method that does not need 3 simultaneous primary color elements is referred to as field-sequential color. In this method an imaging device is illuminated with just one color primary at a time. One can envision a color-wheel that filters the white light and allows passage of first red, then green, then blue light, to be directed onto the imager, and if the sequencing is fast enough the human eye will integrate these R, G, B subimages into one full color image. In the early days of television it was proposed to use field-color sequential display, with a rotating color wheel in front of a white (broadband) emissive display (e.g. CRT) and cycle between red, green, and blue color subimages, and let the human eye-brain synthesize these 3 primary color images to one full-color image.) Very recently the use of field-sequential color has been revived, with the Texas Instruments Digital Micromirror Device (DMD), wherein a single proprietary (expensive) DMD chip can be used with a quickly rotating color wheel to create 180 color fields per second and therefore 60 full-color frames per second. In order to alleviate the flickering effect of this sequential color display, the color wheel might rotate still faster, to provide 120 full-color frames per second.

The major drawback of this type of display is that one-third of the light emanating from the display (in the case of a single-chip DMD, transmitted through the color wheel and reflected off of the micromirror elements) is used at any one time, and due to a "dead-band" required between the color segments (to prevent any color cross-talk) this may be further reduced to around 30% light utilization efficiency.

Whereas all displays appear to be improved with increased brightness, this potential 30% efficiency is a serious detriment.

Another recent attempt at producing a color-sequential device concentrates three bands of light (R, G, and B stripes) onto a single display and "scrolls" these colors dynamically to produce a higher efficiency. The drawback of this "scrolling color" method is the bulkiness of a scanner to scroll the illumination and awkwardness of addressing the imager in a somewhat arbitrary (random access) manner as opposed to simple progressive line manner.

Shimizu of N. Am. Philips Labs has presented papers at display conferences on this idea that promises to use nearly 100% of the light, but requires that three sub-bands of R, G and B light be incident on the single imaging device and (barber-pole-wise) scrolled so that just as the B (e.g.) light segment finishes lighting the bottom of the display, it is starting to light up the top of the display and G and R (e.g.) are right behind in continuous sequence. This is a very difficult optical task, to "scroll" the three separate light source color bands onto the LCD.

This invention utilizes all of the light all of the time, i.e. the light utilization efficiency may be nearly 100% (disregarding typical light collection losses which all systems have to some extent).

In the present invention includes a color separation means so that R, G and B wavelength bands are directed to distinct color component sub-pixels (sometimes called dots) that are arranged in a dot-matrix, color triad arrangement (e.g., stripe or delta) to form individual picture elements (pixels). The entire picture is optically shifted from one set of color component sub-pixels to another in a 3-field sequence. As a result, the sets of R, G, and B color component sub-pixels appear to an observer as a single full-color image. This invention is sometimes called a dot sequential color display.

This small shifting of the picture must take place rapidly (i.e. at a fast field rate) but will be much less noticeable than the complete change of color that accompanies the typical field sequential color display. The dot sequential display of this invention differs from a field sequential display in that the former uses different sub-pixels or dots for each color component, whereas the latter successively uses the same pixels for each color component. The field sequential display suffers from a macro-color flicker effect that is very noticeable unless the field rate is much higher than 180 Hz.

Dot-sequential Color uses a single LCD (or DMD, etc.) imaging device at the desired final resolution, but creates 3 slightly displaced images over time, to make the equivalent of a full-color image with very low cost. This invention therefore exploits the ability of the human eye to synthesize three displaced color images into an equivalent higher resolution color image. Such a displacement may also be called "dithering" or "dot dither".

The chromatic separation also preferably uses a holographic grating, but as a compensating dispersion, and not as a microlens. A better solution is provided for putting RG and B wavelengths into spatially distinct pixel regions (RGB subpixels) and a more economical method of displacing the image in time is described. This display system and method provides high-efficiency illumination and a high-resolution image to the human eye.

The invention further includes a color filter to which diverging red, green and blue channels are directed. The color filter includes a holographic grating positioned between a refractive lens array and an imaging plane, such as the pixel apertures of an imaging device (e.g., LCD). The color filter functions to counter-diverge the color channels so that the average angle for all three exiting channels (i.e. R, G and B) is made to be substantially normal to the imaging plane (e.g., the imaging device). In one implementation this provides a telecentric configuration in which the pixel apertures of the imaging device are located at the front focus, resulting in the chief rays being parallel to the optical axis in the image space (i.e., normal to the plane of imaging device).

Additional objects and advantages of the present invention will be apparent from the detailed description of the preferred embodiment thereof, which proceeds with reference to the accompanying drawings.

BRIEF DESCRIPTION OF DRAWINGS

FIG. 2 is a diagrammatic illustration of color component pixel addressing in a conventional prior art field sequential display system.

FIG. 4 is a diagrammatic time-sequential illustration of one implementation by which the portions of a color component plane are delivered to a display device at successive times.

FIG. 18 is a diagrammatic illustration of a dynamic post-display pixel element alignment system or "wobbler" that includes two prism arrays with piezoelectric actuator stacks therebetween.

FIG. 19 illustrates a dynamic post-display pixel element alignment system or "wobbler" that includes a flat doubly birefringent crystal.

DETAILED DESCRIPTION

The present invention relates to pixelated electronic (e.g., liquid crystal display, digital micromirror device, etc.) projection displays, sometimes referred to as electronic display projectors. The invention includes a dot sequential color display system that may be used in such an electronic display projector. It will be appreciated, however, that the dot sequential color display system of the present invention could alternatively be used in other display applications.

Figure 1:
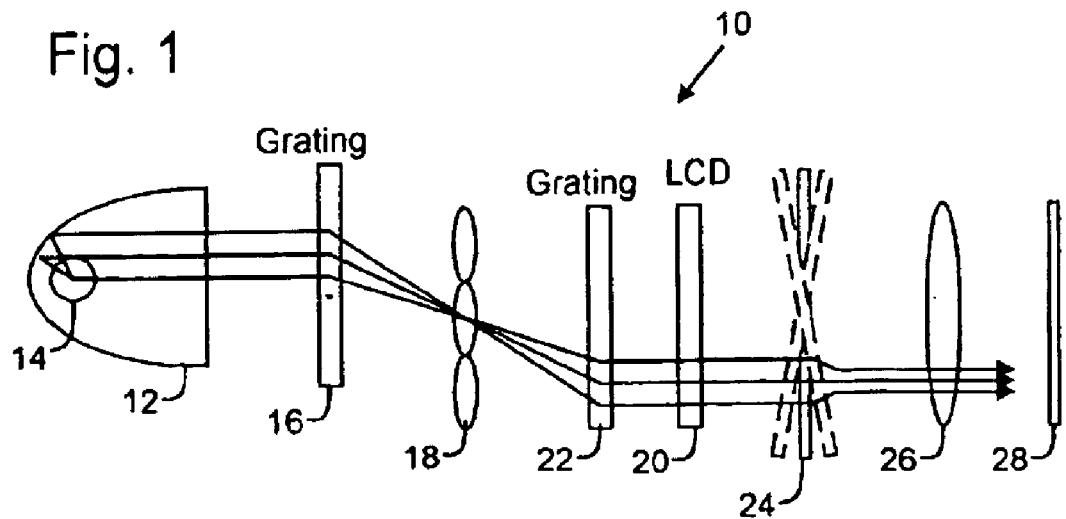
FIG. 1 is an optical schematic illustration of a dot sequential color display system according to the present invention.

FIG. 1 is an optical schematic illustration of a dot sequential color display system 10 according to the present invention. A parabolic reflector 12 collects generally white light from a lamp 14 (e.g., an arc lamp) and directs the light in generally parallel rays to a first grating 16. Grating 16 disperses or separates color components of the light (e.g., red, green and blue "RGB") and directs them to a microlens array 18 that focuses the dispersed light onto or toward a pixelated electronic display (e.g., a liquid crystal display) 20. A second grating 22 re-normalizes the angle of incidence for the color components (e.g., RGB), thereby compensating for the dispersion imparted by grating 16.

LCD 20 includes triads of color component sub-pixels for controlling the intensity of each color component of light (e.g., RGB). A wobbler or "dot-shifter," such as a dynamically tilted plate 24, is tilted at a fast field rate to form a three-frame sequence. Plate 24 is dynamically tilted, "wobbled," or dithered in synchronism with the application of color component image signals to LCD 20 to direct three overlapping images of color component sub-pixels or dots to a projection lens assembly 26. Projection lens assembly 26 projects the overlapping images of color component sub-pixels or dots onto a display screen 28 that is viewed by one or more observers.

FIG. 2 is a diagrammatic illustration of color component pixel addressing in a conventional prior art field sequential display system 30. Display system 30 includes a frame buffer memory 32 with red, green, and blue color component planes 34 that store at each of multiple addresses or locations 36 a value corresponding to the intensity of a color component for a pixel of a display image. Although color component planes 34 are illustrated as being separated for each of the red, green, and blue color components, it will be appreciated that in many implementations the locations 36 of the color component planes 34 are interleaved in the physical memory structure where the color component values are stored.

At successive times t1, t2, and t3, the color component information for a corresponding single color component plane 34 is delivered to and a corresponding image is rendered by a pixelated display device 38, such as a liquid crystal display or a digital micromirror device. The pixels 40 of display device 38 have a one-to-one correspondence with locations 36 in frame buffer memory 32. For example, frame buffer memory 32 with color component planes 34 having j-by-k (columns-by-rows) arrays of addresses 36 will correspond to display device 38 having an x-by-y array of pixels 40. In one common display format, the j-by-k arrays of addresses 36 and the x-by-y array of pixels 40 may correspond to 1024-by-768. It will be appreciated that the arrays of addresses in some frame buffer memories may be of a size different than (e.g., typically larger than) the array of pixels in the display device. In these situations, the above description is directed to the matching portions of the frame buffer memory and display device arrays.

For purposes of illustration, display device 38 is illustrated as receiving and rendering the red, green, and blue color components at successive times t1, t2, and t3, respectively. At each time t1, t2, or t3, display device 38 functions to render monochrome red, green, or blue image information. The red, green, and blue color components rendered at successive times t1, t2, and t3 by display device 38 are superimposed on a display screen to form an image.

Figure 3:
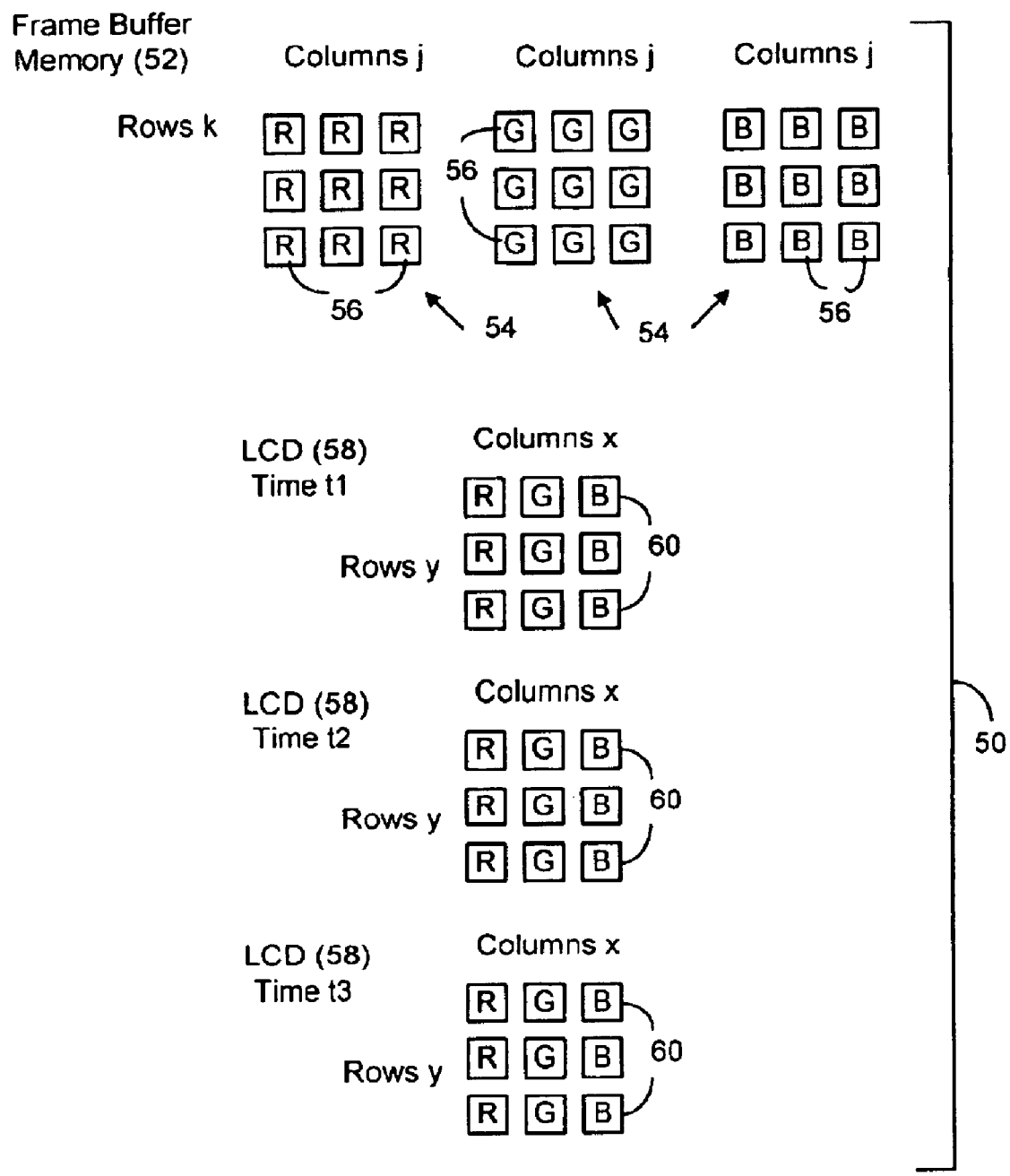
FIG. 3 is a diagrammatic illustration of color component pixel addressing in a dot sequential display system according to the present invention.

FIG. 3 is a diagrammatic illustration of color component pixel addressing in a dot sequential display system 50 according to the present invention. Display system 50 includes a frame buffer memory 52 with red, green, and blue color component planes 54 that store at each of multiple addresses or locations 56 a value corresponding to the intensity of a color component for a pixel of a display image. Although color component planes 54 are illustrated as being separated for each of the red, green, and blue color components, it will be appreciated that in many implementations the locations 56 of the color component planes 54 are interleaved in the physical memory structure where the color component values are stored.

At successive times t1, t2, and t3, a portion (e.g., one-third) of the color component information for each of the color component planes 54 is delivered to and a corresponding partial image is rendered by a pixelated display device 58, such as a liquid crystal display or a digital micromirror device. The pixels 60 of display device 58 have a one-to-one correspondence with a portion (e.g., one-third) of locations 56 in frame buffer memory 52. For example, frame buffer memory 52 with color component planes 54 having j-by-k (columns-by-rows) arrays of addresses 56 will correspond to display device 58 having an x-by-y array of pixels 60. In one common display format, the j-by-k arrays of addresses 36 may correspond to 1024-by-768, and the x-by-y array of pixels 40 may correspond to 1024-by-768. Color component information in an array of about 1024/3-by-768 addresses 56 from each color component plane 54 is delivered to display device 58 at each time t. It will be appreciated that the arrays of addresses in some frame buffer memories may be of a size different than (e.g., typically larger than) the array of pixels in the display device. In these situations, the above description is directed to the matching portions of the frame buffer memory and display device arrays.

At each time t1, t2, or t3, display device 58 functions to render a portion (e.g., one-third) of the full-color image information. These partial full-color images are distinct from the successive monochrome images formed in conventional field sequential system 30. The partial full-color images rendered at successive times t1, t2, and t3 by display device 58 overlap and are interleaved on a display screen to form an image 62.

FIG. 4 is a diagrammatic time-sequential illustration of one implementation by which the portions of a color component plane 54 (e.g., green) are delivered to display device 58 at successive times t1, t2, and t3. For purposes of simplicity, this illustration shows only a small fraction (e.g., 6 columns) of the typically many more of columns locations 56 and pixels 60 in color component plane 54 and display device 58, respectively. Moreover, this description of green color component plane is similarly applicable to the red and blue color component planes 54.

At a step 70 corresponding to a time t1, color component information in every third column of addresses or locations 56 in green color component plane 54 is delivered to every corresponding third column of pixels 60 in display device 58. In the illustration of step 70, for example, columns j and j+3 of locations 56 in green color component plane 54 are delivered to corresponding columns x+1 and x+4 of pixels 60 in display device 58.

At a step 72 corresponding to a time t2, color component information in every next successive third column of locations 56 in green color component plane 54 is delivered to every corresponding third column of pixels 60 in display device 58. In the illustration of step 72, for example, columns j+1 and j+4 of locations 56 in green color component plane 54 are delivered to corresponding columns x+1 and x+4 of pixels 60 in display device 58.

At a step 74 corresponding to a time t3, color component information in every next successive third column of locations 56 in green color component plane 54 is delivered to every corresponding third column of pixels 60 in display device 58. In the illustration of step 72, for example, columns j+2 and j+5 of locations 56 in green component plane 54 are delivered to corresponding columns x+1 and x+4 of pixels 60 in display device 58.

The operations described for green color component plane 54 are simultaneously carried out for red and blue color component planes 54. The color component information in every third column of addresses or locations 56 in green color component plane 54 is successively delivered to every corresponding third column of pixels 60 (e.g, columns x+1 and x+4) in display device 58. Similarly, the color component information in every third column of addresses or locations 56 in red color component plane 54 is successively delivered to every corresponding third column of pixels 60 (e.g, columns x and x+3) in display device 58, and the color component information in every third column of addresses or locations 56 in blue color component plane 54 is successively delivered to every corresponding third column of pixels 60 (e.g, columns x+2 and x+5) in display device 58. Accordingly, each column of pixels consistently receives color component information of only one color component.

Figure 5:
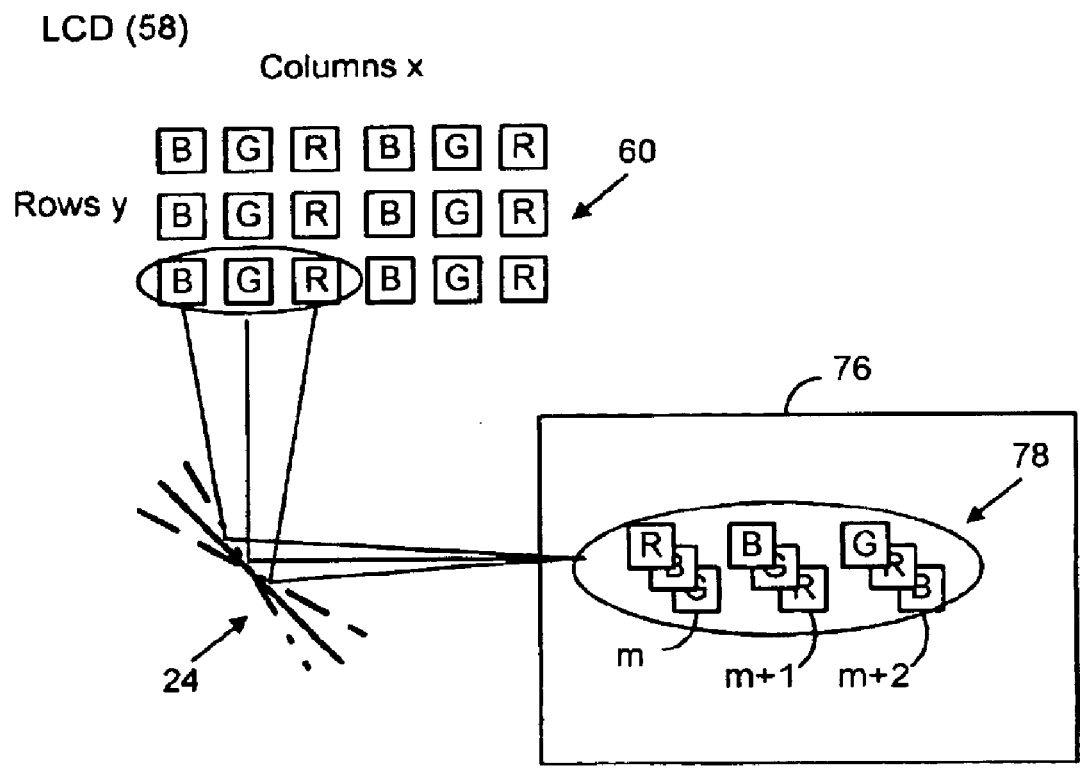
FIG. 5 is a diagrammatic illustration of cumulative successive times during which portions of all three color component planes are delivered to a display device during one image frame.

FIG. 5 is a diagrammatic illustration of the cumulative times t1, t2, and t3 during which portions of all three color component planes 54 are delivered to display device 58 during one image frame. Display device 58 illustrates that at each of times t, pixel columns x and x+3 receive blue color component information, pixel columns x+1 and x+4 of display device 58 receive green color component information, and pixel columns x+2 and x+5 of display device 58 receive red color component information.

Wobbler 24 illustrates its positions at times t1, t2, and t3 and also the manner in which wobbler 24 superimposes on a display screen 76 red, green, and blue color components rendered at successive times t1, t2, and t3 to form three exemplary pixels 78 (m, m+1, and m+2) of a display image.

TABLE 1

| Time | Display Device Pixels | | | Display Screen Pixels | | |
|------|------|------|------|------|------|------|
| t1 | x + 1<br>Green | x + 2<br>Red | x + 3<br>Blue | m<br>Green | m + 1<br>Red | m + 2<br>Blue |
| t2 | x<br>Blue | x + 1<br>Green | x + 2<br>Red | m<br>Blue | m + 1<br>Green | m + 2<br>Red |
| t3 | x − 1<br>Red | x<br>Blue | x + 1<br>Green | m<br>Red | m + 1<br>Blue | m + 2<br>Green |

Dot sequential color display system 10 includes high efficiency, color-separated, fixed illumination of color-component sub-pixels in LCD 20 and dynamic post-display device alignment of the color-component sub-pixels. The color-separated, fixed illumination of color-component sub-pixels in LCD 20 includes splitting the generally white projection light into 3 (or 4) primary color wavelength bands and directing each separate band to separate sub-pixel elements arranged in a color mosaic or color-stripe pattern on LCD 20. Various means can be used to separate the generally white light into color components, including: 1. absorptive (lossy) color filter triads (e.g., Fergason U.S. Pat. No. 5,715,029)—very poor efficiency 2. angular color separation (ACS) (e.g., Hamada, U.S. Pat. No. 5,161,042) 3. holographic ACS (e.g., Huignard et al. U.S. Pat. No. 5,467,206) 4. telecentric approach (e.g., Nishihara U.S. Pat. No. 5,764,319) 5. telecentric filter, microlens+HOE (holographic optical element), described hereinbelow.

The dynamic post-display device re-alignment of the color-component sub-pixels (i.e., wobbling or dithering) includes displacing the image to the eye by a subpixel element in time, over 3 (or 4) field time periods so as to superimpose the color dots on top of each other to realize full color dots. Various wobbling or dithering means can be used, including: 1. Liquid crystal switch and birefringent crystal (e.g., Fergason U.S. Pat. No. 5,715,029) 2. piezo-electric actuators between symmetrical prism arrays, as described below 3. solenoid or piezos to tilt a plate, as described below 4. other mechanical means (e.g., CCD dithering).

The present system and method include separating the color components into mosaic color primary picture elements (on the illumination side of the display) and then subsequently superimposing these elements to the eye (on the viewing side of the display). It may be seen that each of these two processes can be accomplished by a variety of means.

Prior displays described by Fergason (U.S. Pat. No. 5,715,029) and by Nakanishi (U.S. Pat. No. 5,969,832) do not realize the present invention. Fergason suffers significant inefficiency; throwing away ⅔ of the illumination light by using absorptive color filters. Nakanishi requires that the illumination be shifted, which is particularly difficult because the illuminator typically has a significant mass that can be difficult to shift or displace at an adequate frequency, particularly in comparison to the significantly lower mass of a wobbler 24 of the present invention. Moreover, shifting or displacement of the illuminator would make it particularly difficult, if not impossible, to precisely fill or illuminate the pixel apertures of the separate color component light channels. Finally, cross-color contamination could be introduced by such illumination shifting due to display devices (e.g., LCDs) having less than idealized response times. The present invention is much more practical, shifting the display image but statically placing color illumination light into separate dedicated color subpixel elements.

Figure 6:
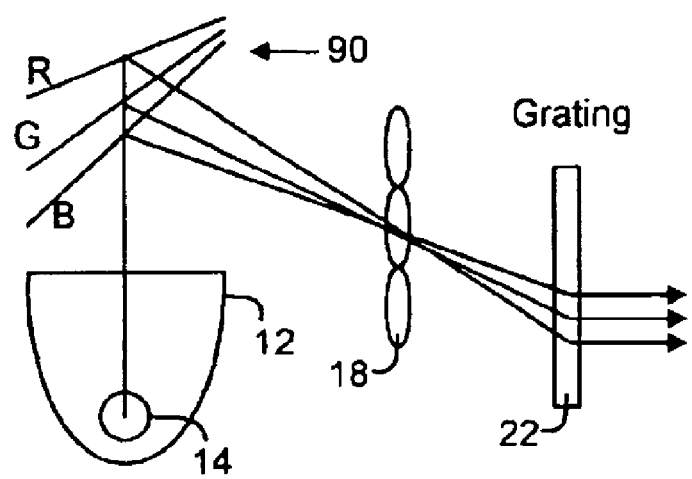
FIGS. 6 and 7 are optical schematic illustrations of alternative implementations of a dot sequential color display system with an angular color separation system.
Figure 7:
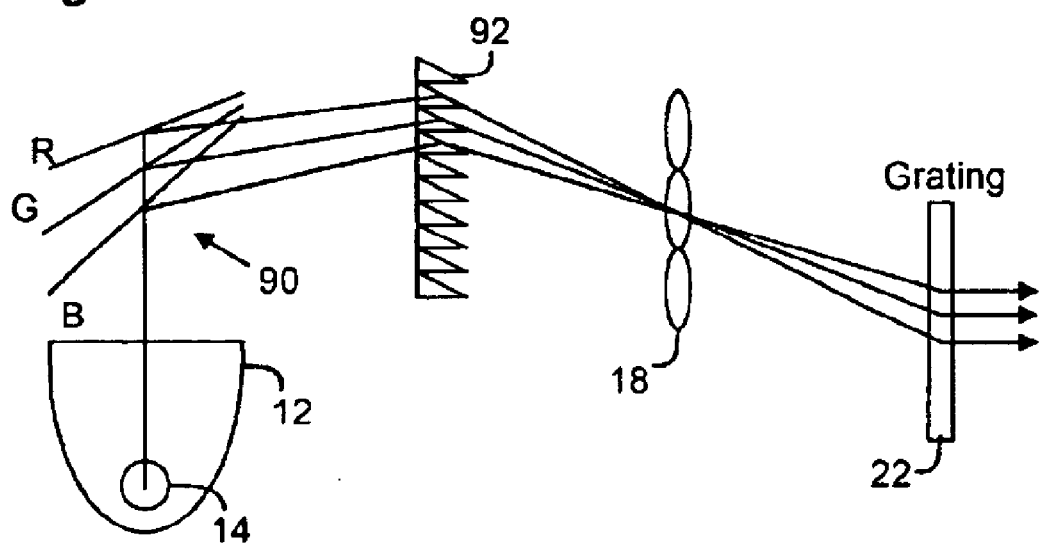
Figure 8:
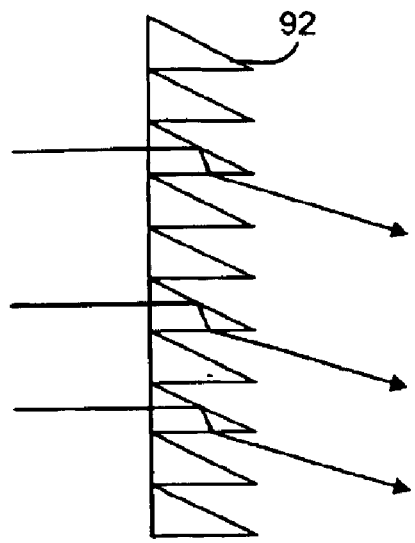
FIG. 8 is an enlarged side view illustrating light propagating through a prism array.

FIGS. 6 and 7 are optical schematic illustrations of alternative implementations of this invention in which grating 16 of dot sequential color display system 10 is replaced with an angular color separation system 90 of the type described in U.S. Pat. No. 5,161,042 of Hamada. The implementation of FIG. 7 further includes a prism array 92 that functions as a total internal reflection (TIR) 'deflector' that receives normal incident light and deflects or angles the light to some desired direction so as to be appropriate for the next stage. FIG. 8 is an enlarged side view illustrating light propagating through prism array 92.

Figure 9:
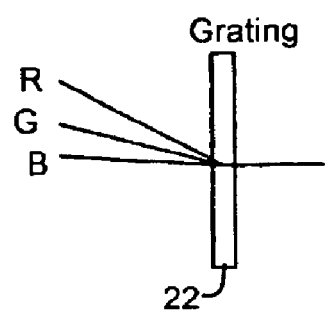
FIG. 9 illustrates renormalization of RGB light channels as facilitated by the prism array of FIG. 8.

In the implementations of FIGS. 6 and 7, grating 22, whether holographic or not, is positioned between microlens array 18 and the pixel apertures of LCD 20. This allows the incident RGB light channels to be renormalized (as illustrated in FIG. 9) and go through the RGB pixel apertures at approximately the same (0 degree) angle. For example, a holographic grating 22 may be positioned midway between microlens array 18 and the pixel elements of LCD 20. The renormalization that this provides is the same as that provided by two layers of microlenses or a microlens and a microprism (see for example U.S. Pat. No. 5,764,319 of Nishihara), but with a larger angular acceptance angle and an easier, more exacting renormalization.

In contrast, angular color separation systems of the type described in U.S. Pat. No. 5,161,042 of Hamada have output angles that are widely diverging with a center channel on-axis but two outer channels emanating to extreme directions left and right from that. In such prior systems, the dispersive (e.g. holographic) element is positioned first, then a microlens near the LCD. U.S. Pat. No. 5,467,206 also contemplates making the hologram perform as a microlens. The present invention places the holographic diffractive element between the microlens and the pixel apertures, in contradistinction to the '206 patent in which the microlens is placed between the HOE and the pixel.

Figure 10:
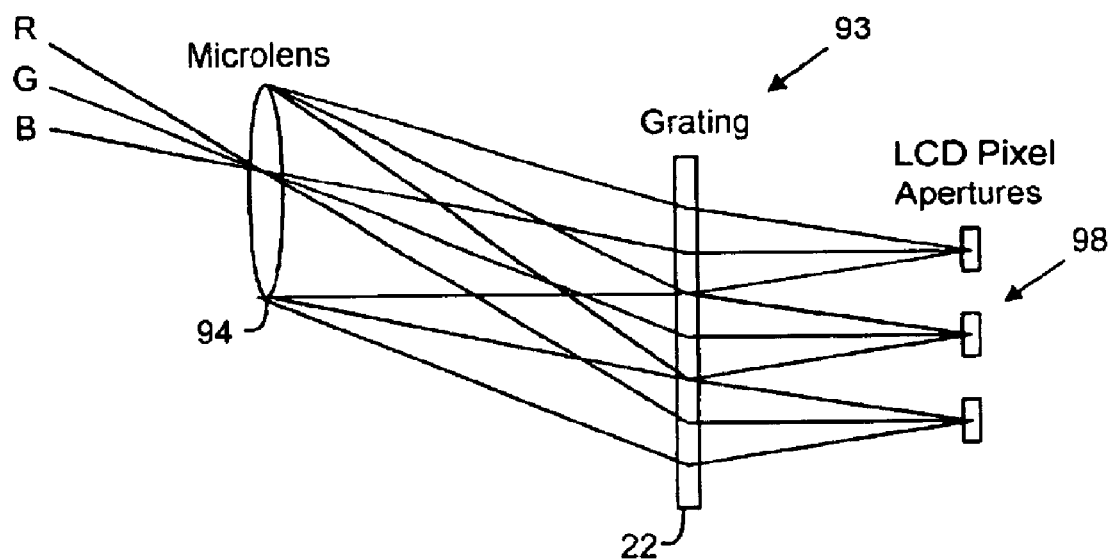
FIG. 10 is an optical schematic illustration of a diffractive color filter that includes a holographic grating.

FIG. 10 is an optical schematic illustration another implementation in which a color-dispersing element (e.g., a grating or ACS of Hamada, not shown) separates the light into 3 different angular channels for three distinct wavelength ranges—red, green and blue. These three channels pass in sequence through a color filter 93 that includes a refractive (i.e., not holographic) lens array 94 (which may preferably be an array of cylindrical lenses, i.e. a lenticular) and a holographic grating 96 to an imaging device 98 (e.g., LCD), such that the average angle for all three exiting channels (i.e. R, G and B) is made to be substantially normal to the imaging plane of imaging device 98. As illustrated in FIG. 10, this provides a telecentric configuration in which the pixel apertures of imaging device 98 are located at the front focus, resulting in the chief rays being parallel to the optical axis in the image space (i.e., normal to the plane of imaging device 98).

This arrangement of dispersive (color-separating) element plus (refractive) lens array element 94 plus holographic (counter-dispersive) element 96 is unique and has the important feature that final grating 96 is continuous and without any optical power. As a result, final (holographic) grating 96 need not be aligned to the pixels of imaging device 98 other than to ensure that the grating axis is parallel with the columns of the display pixels. The micro-lenticular 94 is carefully aligned, but this may be added onto the built and tested imaging device 98 as a secondary process step, which would increase the manufacturing yield rate for both imaging device 98 and lenticular 94. The "dispersion-compensating" element 96 is preferably a volume hologram so as to be able to be immersed and which has a high diffraction efficiency over the narrow angles that it is designed to accept. In contrast, a surface grating cannot be glued between glass or plastic optical layers.

In one embodiment, the first color dispersive element is identical to the final counter-dispersive element 96 and both are volume holographic transmission gratings. From the standard simplified grating equation: lambda divided by "d"=sin(input angle)+sin(output angle), in which lambda is the wavelength of light and d is the grating spacing. The ideal input angle can be selected based on an arbitrary color channel separation angle. In the case of the output angle being normal to the holographic plane, and for lambda for green light of approximately 0.55 microns wavelength, the formula may also reveal a nominal grating spacing, "d":"d"= 0.55 divided by sin(input angle) or likewise input angle= arcsin (d/lambda) Table 2 below shows various channel spacings as a function of incident (input) green light.)

TABLE 2

| Channel separation (delta R-G) | Red incident angle (degrees) | Green incident angle | Blue incident angle | Grating spacing (microns) |
| --- | --- | --- | --- | --- |
| 8 | 49 | 41 | 33 | 0.83 |
| 6 | 39 | 33 | 27 | 1.0 |
| 4 | 28 | 24 | 20 | 1.35 |
| 3 | 21 | 18 | 15 | 1.75 |
| 2 | 14.7 | 12.7 | 10.7 | 2.5 |

Note that spatial frequency is inverse of "d". Multiply by 1000 to get cycles/mm. Therefore a grating spacing of 1.75 microns corresponds to 571 cycles/mm.

In a specific application, a suitable LCD is selected, with a specific pixel spacing "p" and glass substrate thickness "h": The holographic element is desirably a volume grating, as opposed to surface (replicated, etc) structure. This volume grating suppresses the higher diffraction orders so that principally one channel for each R, G and B bundle is obtained, not multiple random paths. The off-axis higher orders can probably be eliminated within the projection lens, since it would tend to vignette such extreme angles.

The central angle (i.e. for 550 nm green light) may be adjusted as required to match the LCD pixel pitch (spacing between R, G, B subpixels) and the thickness of LCD substrate glass and the HOE thickness. The grating functions to straighten out each of the wavelength bands, so the input angles are designed arbitrarily to get maximum efficiency for red (e.g., 632 nm), green (e.g., 546 nm) and blue (e.g., 480 nm). A specific LCD of interest has 0.7 mm glass and a subpixel pitch of 42 microns. A simple ray trace gives a nominal design with 2 degrees between each color primary, so the HOE can be made to do a 'normalization' for green light. The central illumination angle for green is then designed so that red and are blue diffracted on either side at about 2 degrees. In this case the nominal input angle is 15 degrees, and the spatial frequency of the transmission (holographic) grating is about 1000 cycles per mm.

In one implementation, there may be some refinement since the diffraction is not linear. The photopic response of the eye makes it less important to worry about blue light below 450 nm and red light above 660 nm, and the lamp has its own unique spectral signature. Generally the yellowish peak (Hg has strong 579 line) is attenuated since this light contaminates both red and green color primary channels.

The microlens may be refractive and needs to be precisely aligned with the LCD. The holographic grating should be relatively thick to suppress higher orders and yet structurally thin so that the spacing from microlens to LCD pixel can be minimized to increase the angular acceptance for the illumination. The hologram not need have any lens function, counter to the teaching of U.S. Pat. No. 5,467,206.

Figure 11:
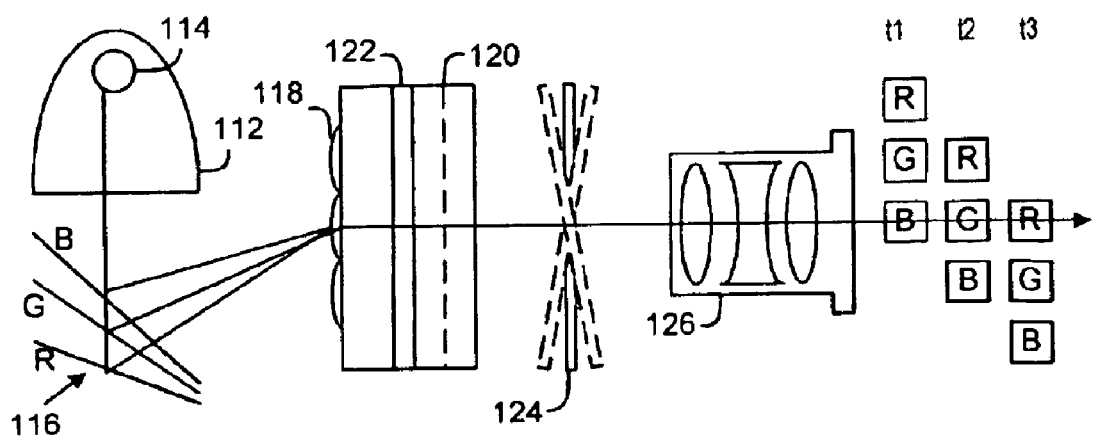
FIG. 11 is an optical schematic illustration of another dot sequential color display system according to the present invention.

FIG. 11 is an optical schematic illustration of another dot sequential color display system 100 according to the present invention. A parabolic reflector 112 collects white light from a lamp 114 (e.g., an arc lamp) and directs it in parallel rays to an angular color separation (ACS) system 116. ACS system 116 disperses or separates color components of the light and directs them to a microlens array 118 that focuses the dispersed light onto a pixellated electronic display (e.g., a liquid crystal display) 120. A holographic optical element 122 re-normalizes the angle of incidence for the color components (e.g., RGB), thereby compensating for the dispersion imparted by ACS system 116.

LCD 120 includes triads of color component sub-pixels for controlling the intensity of each color component of light (e.g., RGB). A "dot-shifter," such as a dynamically tilted plate 124, is tilted at a fast field rate to form a three-frame sequence. Plate 124 is dynamically tilted, "wobbled," or dithered in synchronism with the application of color component image signals to LCD 120 to direct three overlapping images of color component sub-pixels or dots to a projection lens assembly 126. Projection lens assembly 126 projects the overlapping images of color component sub-pixels or dots 128 onto a display screen (not shown) that is viewed by one or more observers.

Figure 12:
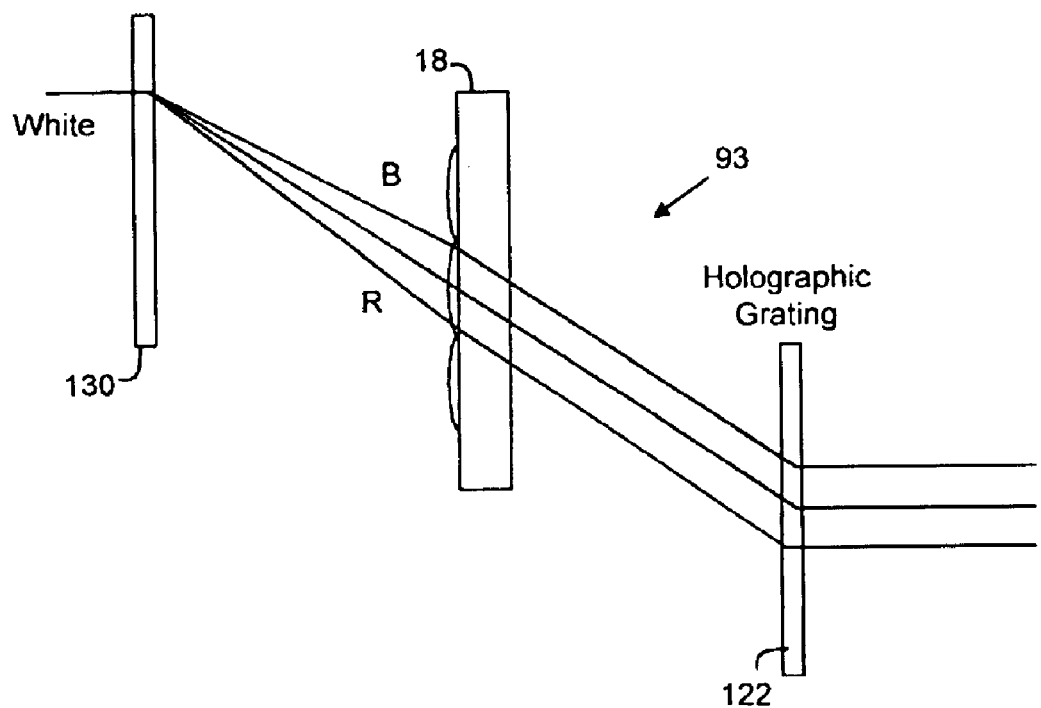
FIG. 12 is an alternative optical schematic illustration of a diffractive color filter with a holographic optical element grating.

FIG. 12 is an optical schematic illustration of an alternative implementation of dot sequential color display system 100 in which a holographic optical element 130 (e.g., grating) that disperses or separates color components of the light and directs them to a microlens array 118 is substituted for ACS system 116. Holographic optical element 130 cooperates with color filter 93 to function as a uniform telecentric color separator, which as illustrated in FIG. 10 means that the pixel apertures of imaging device 98 are located at the front focus, resulting in the chief rays being parallel to the optical axis in the image space (i.e., normal to the plane of imaging device 98 as illustrated). In one implementation, holographic optical element 130 and holographic optical element 122 are identical and microlens array 118 is of the lenticular type.

Figure 13:
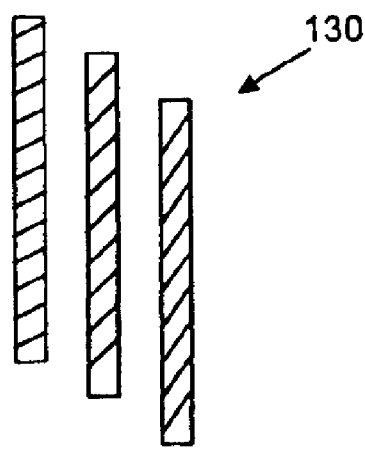
FIG. 13 is an exploded functional illustration of a holographic optical element grating functioning as a uniform telecentric color separator.

FIG. 13 is an exploded functional illustration of holographic optical element 130. Holographic optical element 130 includes three holographic lens grating layers, each for diffracting a different wavelength range. In the illustrated implementation, $\Delta n$ and thickness are controlled to give each layer a bandwidth of 60–75 nm, for example.

Figure 14:
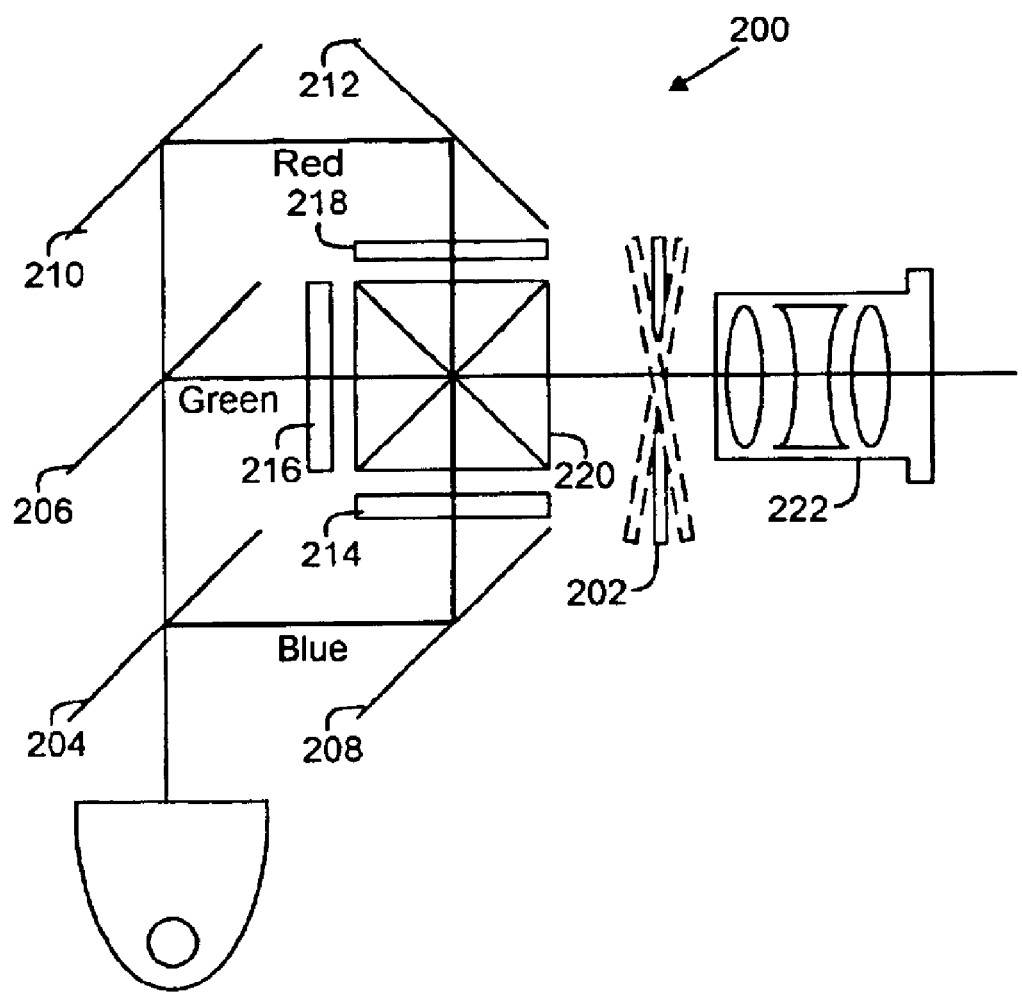
FIG. 14 is an optical schematic illustration of a resolution enhancing dot sequential color display system according to the present invention.

FIG. 14 is an optical schematic illustration of a resolution enhancing dot sequential color display system 200 according to the present invention. Dot sequential color display system 200 illustrates a conventional three-panel color projector configuration that further includes a "dot-shifter," such as a dynamically tilted plate 202, which is tilted at a fast field rate to form a four-frame sequence. For example, dot sequential color display system 200 includes a pair of color separating dichroic mirrors 204 and 206 that reflect respective blue and green light and transmit other light. Fold mirrors 208, 210, and 212 redirect the color separated light components toward monochrome display devices (e.g., LCDs) 214, 216, and 218. An X-cube prism combination 220 combines the color component images, which pass through dynamically tilted plate or wobbler 202 to a projection lens assembly 222.

Figure 15:
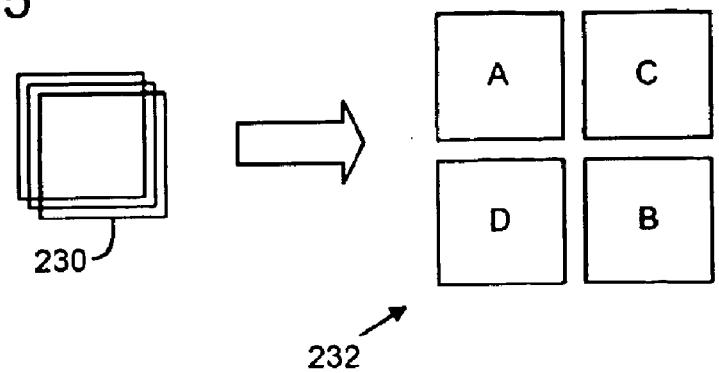
FIG. 15 illustrates resolution enhancement provided by the display system of FIG. 14.

FIG. 15 illustrates the resolution enhancement provided by display system 200. Display image pixel 230 illustrates the overlapping color component sub-pixels provided by a conventional three-panel color projector configuration (The color component sub-pixels are shown with slight offset for purposes of illustration). Display image pixel 232 illustrates one implementation of four non-overlapping color component sub-pixels 234 provided by dynamically tilted plate 202 of display system 200.

Figure 16:
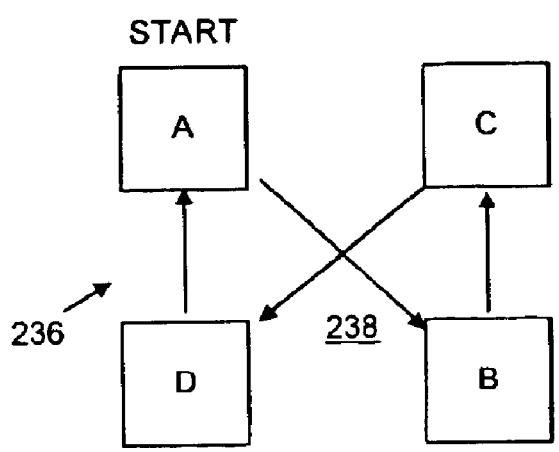
Figure 17:
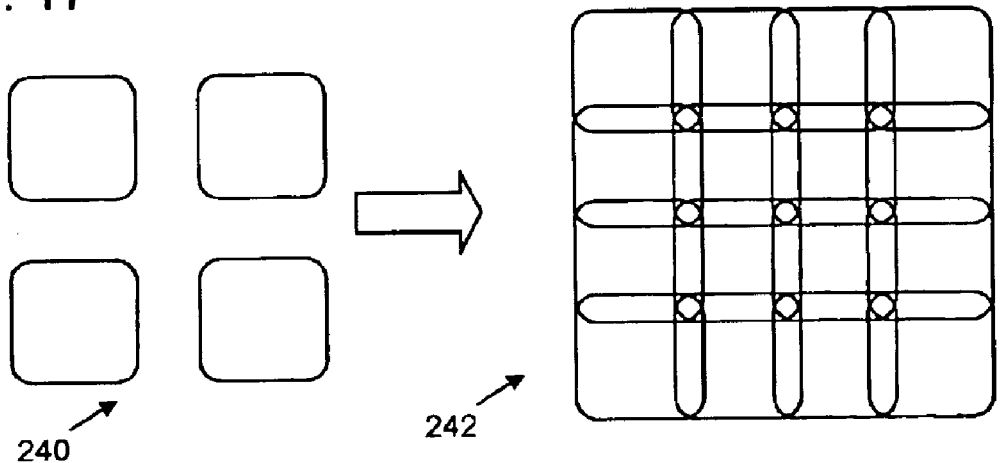
FIG. 17 further illustrates resolution enhancement provided by the display system of FIG. 14.

FIG. 16 shows an expanded non-overlapping pixel 236 with an exemplary sub-pixel displacement sequence 238 (sometimes referred to as a "bowtie" sequence) that includes alternating diagonal and vertical sub-pixel displacements. Sequence 238 is preferable over circumferential sequence (e.g., sub-pixels A, D, B, and C) because the alternating rows of sequence 238 are compatible with interlaced display formats, such as standard television. FIG. 17 further illustrates the resolution enhancement provided by display system 200. Pixels 240 illustrate a conventional original four full-color pixels without displacement. Pixels 242 illustrate 16 apparent full-color pixels that are provided by sub-pixel displacement. The non-overlapping arrangement of color component sub-pixels 242 provides an enhanced image resolution. (The 16 pixels are shown with slight offsets for purposes of illustration).

FIGS. 18–22 are diagrammatic illustrations of dynamic post-display pixel element alignment systems or "wobblers." FIG. 18 shows two prism arrays 250 and 252 with two piezoelectric actuator stacks 254 and 256 and a voltage waveform that is applied to piezoelectric actuator stacks 254 and 256. The voltage waveform cooperates with piezoelectric actuator stacks 254 and 256 to separate prism arrays 250 and 252 by different distances so as to shift color component dots into alignment to get the desired R, G, B superposition.

FIG. 19 illustrates a dynamic post-display pixel element alignment system or "wobbler" that includes a flat doubly birefringent crystal 260 (e.g., calcite) with a crystal polarization direction 262. Crystal 260 and its polarization direction are rotated about a central axis 264. Crystal 260 is illustrated in combined front and side views at successive times t1, t2, and t3.

In the illustrated implementation, light has a horizontal polarization so that it passes through crystal 260 without displacement whenever crystal polarization direction 262 is horizontal, as at time t1. Whenever crystal polarization direction 262 is vertically upward, as at time t2, light passes through crystal 260 with an upward displacement. Whenever crystal polarization direction 262 is vertically downward, as at time t3, light passes through crystal 260 with a downward displacement. As crystal 260 rotates, the light will in sequence be displaced in one direction, pass straight through, be displaced in the opposite direction, pass straight through, etc. As a result, image resolution can be tripled to form a pixel pattern 264.

Figure 20:
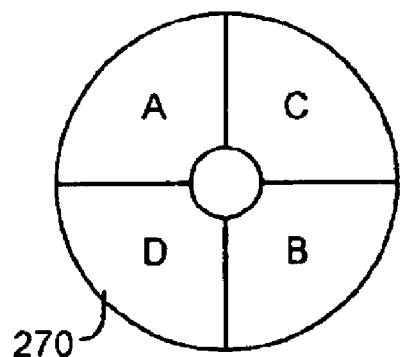
FIG. 20 is a front view of a dynamic post-display pixel element alignment system or "wobbler" that includes a wheel with four flat refractive segments.
Figure 21:
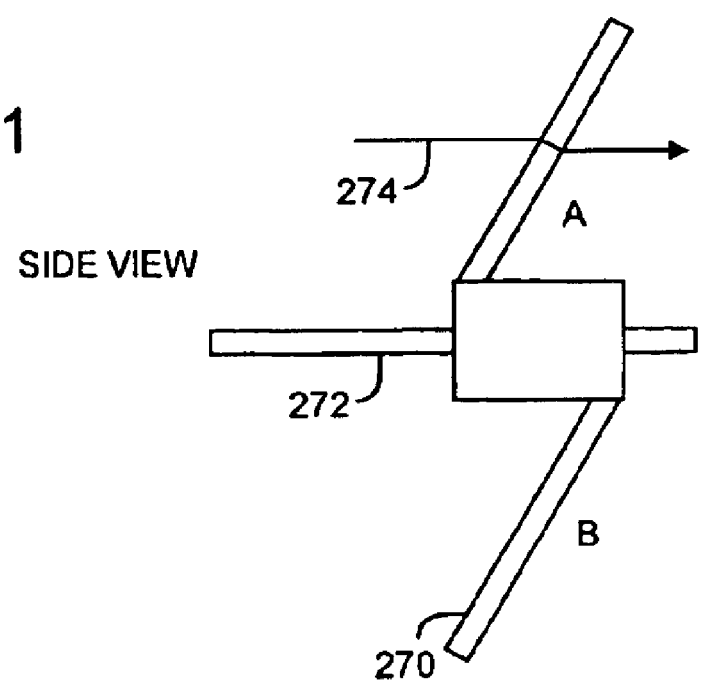
FIG. 21 is a side view of the wheel of FIG. 20.
Figure 22:
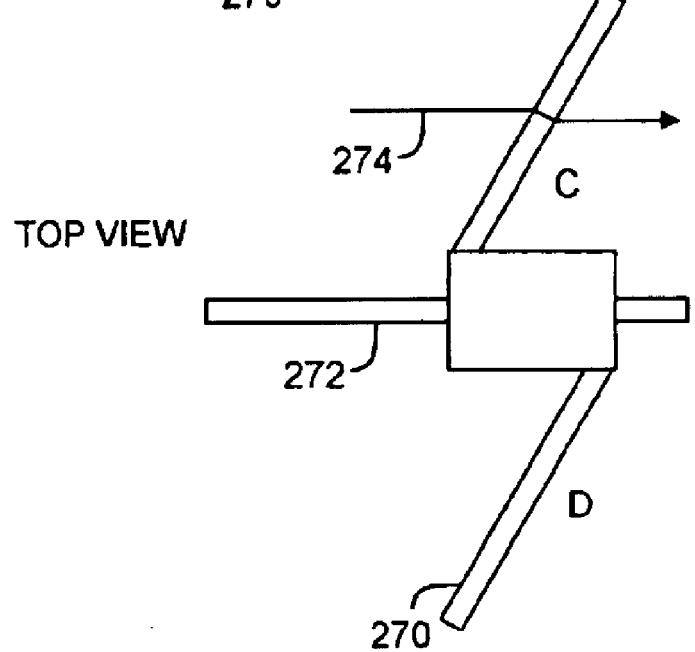
FIG. 22 is a top view of the wheel of FIG. 20.

FIG. 20 is a front view of a dynamic post-display pixel element alignment system or "wobbler" that includes a wheel 270 with four flat refractive segments A, B, C, and D with different angled orientations to displace the light in four different directions. Segmented wheel 270 is rotated about a central axis 272 so that the light propagating along a path 274 passes through the angled segments successively. FIG. 21 is a side view of wheel 270 showing segment A displacing light in a downward direction. It will be appreciated by the orientation of segment B that it will displace light in an upward direction when segment B is positioned across path 274. FIG. 22 is a top view of wheel 270 showing segment C displacing light in a rightward direction. It will be appreciated by the orientation of segment D that it will displace light in a leftward direction when segment D is positioned across path 274.

Although illustrated in a four-segment implementation, it will be appreciated that wheel 270 could alternatively be implemented as three segments, rather than four. In one three segment implementation, for example, a first and a third segment could have the orientations of segments C and D, and an intervening second segment could be oriented with no angular tilt (i.e., perpendicular to path 274).

Figure 23:
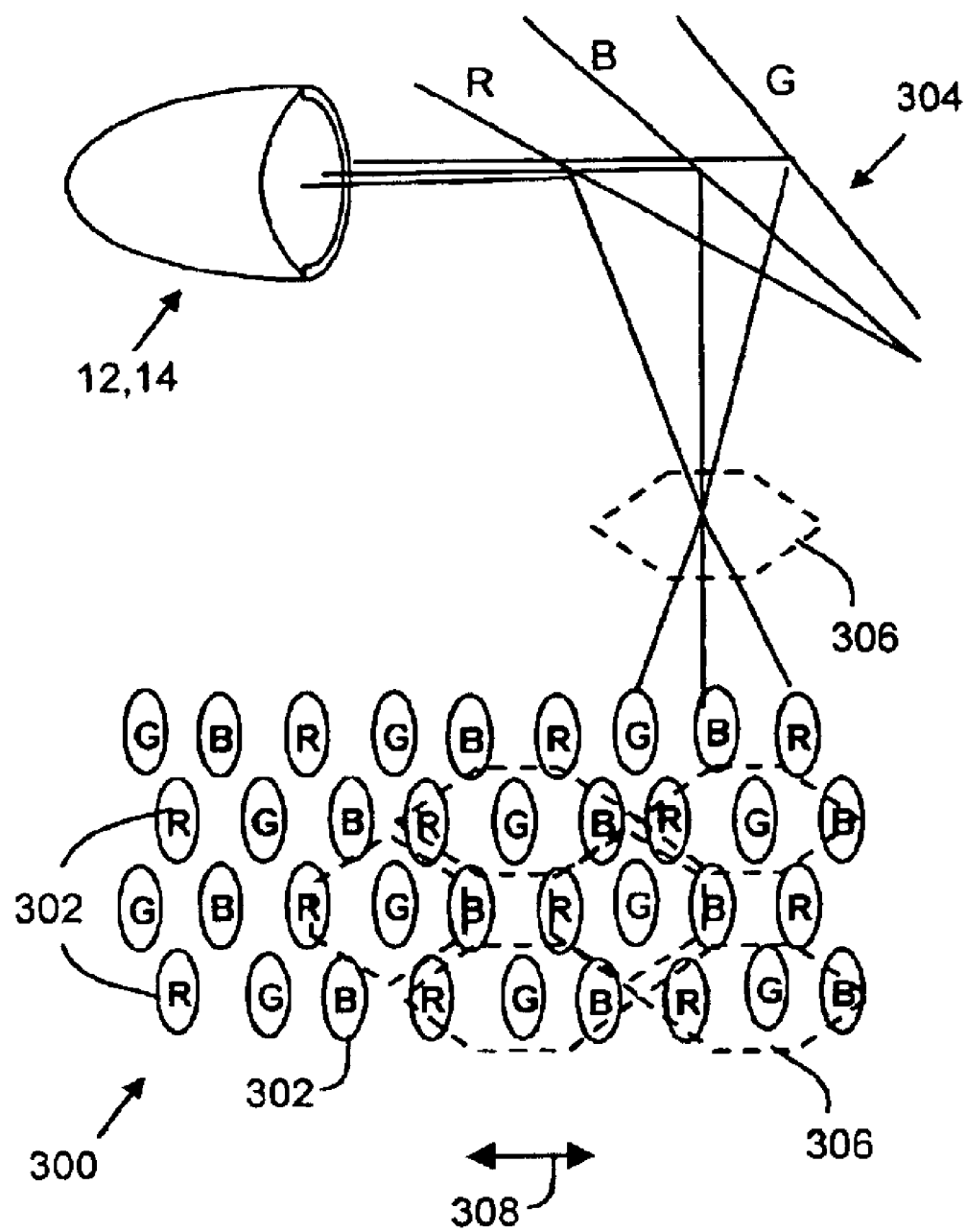
FIG. 23 is a diagrammatic illustration of an alternative color mosaic arrangement of sub-pixels in a display device (e.g., LCD).

FIG. 23 is a diagrammatic illustration of an alternative color mosaic arrangement 300 of sub-pixels 302 in a display device (e.g., LCD). Implementations described above refer to arrangements in which the sub-pixels of each color component are arranged in distinct vertical columns. Color mosaic arrangement 300 positions sub-pixels 302 in a denser, closer-packed arrangement that provides improved image characteristics because the human eye sees the staggered, offset pixel arrangement as having a higher spatial resolution, particularly in the horizontal direction. In addition, television signals may also be sampled with offsets by using alternating clock edges (e.g., chrominance signals).

As with implementations described above, a reflector 12 collects generally white light from a lamp 14 and directs the light through an angular color separation system 304 that provides regular angle color separation in which red, green and blue color components are separated across one axis (e.g., horizontal). In this implementation, the light is shown passing through a microlens 306 having an elongated, close-packed (e.g., hexagonal) configuration in which each microlens 306 is aligned with a full-color triplet of sub-pixels 302. As a result, the microlenses 306 at the display device (e.g., LCD) turn the horizontal angular separation of color into LCD pixel separation. Linear (e.g., horizontal) dot sequential modulation 308 displaces light horizontally during three successive times in each frame to provide a complete display image in accordance with the present invention.

Figure 24:
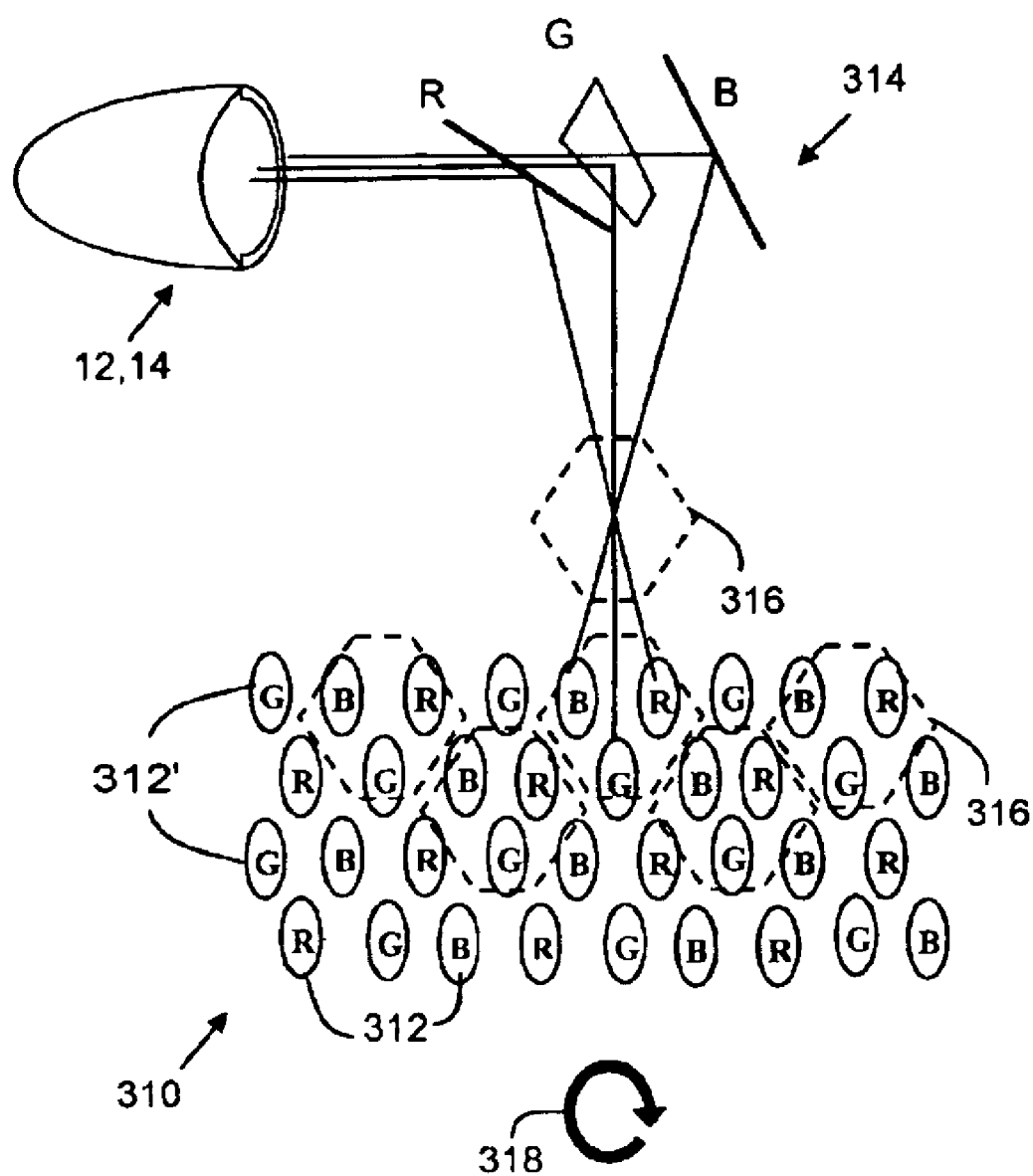
FIG. 24 is a diagrammatic illustration of another alternative color mosaic arrangement of sub-pixels in a display device (e.g., LCD).

FIG. 24 is a diagrammatic illustration of an alternative color mosaic arrangement 310 of sub-pixels 312 in a display device (e.g., LCD). Color mosaic arrangement 310 positions sub-pixels 312 in another dense, closer-packed arrangement that differs from arrangement 300 in that the former includes one sub-pixel 312' (e.g., a center pixel, illustrated as receiving green light) that is offset from alignment with the other two sub-pixels 312.

As with implementations described above, a reflector 12 collects generally white light from a lamp 14 and directs the light through an angular color separation system 314 that provides angle color separation in which red and blue color components are separated from each other across one axis (e.g., horizontal) and from green across two axes (e.g., horizontal and vertical). In this implementation, the light is shown passing through a microlens 316 having a regular, close-packed (e.g., hexagonal) configuration in which each microlens 316 is aligned with a full-color triplet of sub-pixels 312. As a result, the microlenses 316 at the display device (e.g., LCD) turn the angular separation of color into LCD pixel separation. Triangular or circular dot sequential modulation 318 displaces light during three successive times during each frame to provide a complete display image in accordance with the present invention.

In view of the many possible embodiments to which the principles of our invention may be applied, it should be recognized that the detailed embodiments are illustrative only and should not be taken as limiting the scope of our invention. Rather, the invention includes all such embodiments as may come within the scope and spirit of the following claims and equivalents thereto.

What is claimed is:

1. A color display optical system, comprising:
   a refractive lens array for receiving and focusing diverging color components of light;
   an imaging device that defines a plane with an array of pixels with pixel apertures; and
   a holographic grating positioned between the refractive lens and the imaging device to receive the color components of light from the refractive lens array and to align the color components of light along distinct, telecentric, non-diverging paths that are normal to the plane of the imaging device.

2. The system of claim 1 in which the lens array includes an array of cylindrical lenses.

3. The system of claim 1 in which the holographic grating is continuous and without optical power.

4. The system of claim 1 in which the holographic grating includes a volume hologram.

5. The system of claim 1 further comprising a color divergence element that provides the diverging color components of light to the refractive lens array.

6. The system of claim 5 in which the color divergence element includes plural angularly inclined dichroic mirrors for providing color separation of incident multi-color illumination light.

7. The system of claim 5 in which the color divergence element includes a holographic grating for providing color separation of incident multi-color illumination light.

8. The system of claim 7 in which the holographic grating of the color divergence element is substantially the same as the holographic grating for aligning the color components of light.

9. The system of claim 1 in which the holographic grating delivers the distinct color components of light to a selected plane and is positioned substantially midway between the selected plane and the lens array.

10. In an optical system having a focusing element for focusing separated color components of light to plural distinct regions of an imaging plane of an electronic imaging device with an array of pixel apertures, the improvement comprising:

a diffractive color dispersing layer positioned between the focusing element and the imaging plane for aligning the color components of light along distinct, telecentric, non-diverging paths that are normal to the imaging plane at the pixel apertures.

11. The system of claim 10 in which the focusing element includes a microlens array.

12. The system of claim 11 in which the microlens array includes plural cylindrical lenses.

13. The system of claim 10 in which the diffractive color dispersing layer aligns the color components of light to be normal to the imaging plane.

14. The system of claim 10 in which the diffractive color dispersing layer includes a volumetric hologram.

15. The system of claim 14 in which the diffractive color dispersing layer is isotropic and without optical power.

16. The system of claim 10 in which the imaging plane is a transmissive type electronic display panel with pixel apertures in a stripe formation.

17. The system of claim 10 further comprising a color divergence element that provides diverging color components of light to the focusing element.

18. A telecentric color filtering method for providing telecentric color-filtered light to an imaging plane of an electronic imaging device, comprising:

forming plural diverging color light components;

directing the plural diverging color light components through a focusing element positioned before a holographic grating; and directing the plural diverging color light components through the holographic grating to align the color light components along distinct, non-diverging paths that are telecentric with respect to the imaging plane so that all the color light components are normal to the imaging plane.

19. The method of claim 18 in which the focusing element includes a lens array.

20. The method of claim 18 in which forming the plural diverging color light components includes directing multi-color illumination light toward plural angularly inclined dichroic mirrors that provide color separation of the incident multi-color illumination light.

21. The method of claim 18 in which forming the plural diverging color light components includes directing multi-color illumination light through a holographic grating for providing color separation of incident multi-color illumination light.

* * * * *